United States Patent
Georgeson

(10) Patent No.: US 9,856,037 B2
(45) Date of Patent: Jan. 2, 2018

(54) STABILIZATION OF AN END OF AN EXTENDED-REACH APPARATUS IN A LIMITED-ACCESS SPACE

(71) Applicant: The Boeing Company, Chicago, IL (US)

(72) Inventor: Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 661 days.

(21) Appl. No.: 14/307,605

(22) Filed: Jun. 18, 2014

(65) Prior Publication Data

US 2015/0367509 A1    Dec. 24, 2015

(51) Int. Cl.
*B25J 9/06*    (2006.01)
*B64F 5/00*    (2017.01)
*F41A 31/02*    (2006.01)

(52) U.S. Cl.
CPC .............. *B64F 5/0045* (2013.01); *B25J 9/06* (2013.01); *F41A 31/02* (2013.01); *G05B 2219/45066* (2013.01); *Y10S 901/09* (2013.01); *Y10S 901/44* (2013.01); *Y10S 901/47* (2013.01)

(58) Field of Classification Search
CPC .............. G05B 2219/45066; B25J 9/06; B64F 5/0045; Y10S 901/47; Y10S 901/44; Y10S 901/09; F41A 31/02
See application file for complete search history.

(56) References Cited

U.S. PATENT DOCUMENTS

| | | | | |
|---|---|---|---|---|
| 4,848,179 A | * | 7/1989 | Ubhayakar | B25J 9/06 74/490.04 |
| 4,937,759 A | * | 6/1990 | Vold | B25J 9/1602 700/262 |
| 4,954,952 A | * | 9/1990 | Ubhayakar | B25J 9/0084 244/172.5 |
| 5,155,423 A | * | 10/1992 | Karlen | B25J 9/04 318/568.1 |
| 5,581,166 A | * | 12/1996 | Eismann | B25J 9/04 318/568.18 |
| 6,651,991 B2 | * | 11/2003 | Carlstedt | B60G 17/0162 267/188 |
| 6,820,025 B2 | * | 11/2004 | Bachmann | A61B 5/1114 600/595 |

(Continued)

*Primary Examiner* — Sath V Perungavoor
*Assistant Examiner* — Philip Dang
(74) *Attorney, Agent, or Firm* — Ostrager Chong Flaherty & Broitman P.C.

(57) ABSTRACT

Apparatus and methods that can be used to stabilize a portion of an extended-reach tool assembly to enable the dimensional mapping, non-destructive inspection and/or simple repair of elongated and serpentine structures used in aerospace and military platforms. In some embodiments, a jointed (i.e., articulated) arm of the extended-reach tool assembly, which is mounted and manipulated at the entrance to a limited-access space (e.g., a cavity), is equipped with actuatable contact pads or bladders to stabilize the distal end of the arm to which a tool-carrying end effector is coupled. The end effector is capable of holding and orienting a probe or sensor (e.g., NDI sensor unit, laser scanner, camera, etc.) or other tool (e.g., drill, sander, vacuum, "grabber", coating sprayer, etc.).

19 Claims, 8 Drawing Sheets

(56) References Cited

U.S. PATENT DOCUMENTS

| | | | | |
|---|---|---|---|---|
| 6,840,127 B2 * | 1/2005 | Moran | B23Q 1/5462 | |
| | | | 414/735 | |
| 6,863,242 B2 * | 3/2005 | Van De Kreeke | B64C 13/503 | |
| | | | 244/7 R | |
| 7,137,949 B2 * | 11/2006 | Scirica | A61B 17/0293 | |
| | | | 600/210 | |
| 7,171,279 B2 | 1/2007 | Buckingham et al. | | |
| 7,428,855 B2 * | 9/2008 | Duval | B25J 19/0016 | |
| | | | 248/123.11 | |
| 7,798,035 B2 * | 9/2010 | Duval | B25J 19/0016 | |
| | | | 74/490.01 | |
| 8,029,710 B2 * | 10/2011 | Khoshnevis | B05B 13/04 | |
| | | | 105/163.1 | |
| 8,055,021 B2 * | 11/2011 | Caritu | A61B 5/103 | |
| | | | 382/103 | |
| 8,085,296 B2 * | 12/2011 | Yuguchi | G01B 11/002 | |
| | | | 348/82 | |
| 8,086,370 B2 * | 12/2011 | Tollenaar | B66F 9/07559 | |
| | | | 187/222 | |
| 8,219,246 B2 * | 7/2012 | Buckingham | B08B 9/045 | |
| | | | 700/252 | |
| 8,347,746 B2 * | 1/2013 | Hafenrichter | G01M 5/0016 | |
| | | | 73/865.8 | |
| 8,659,652 B2 * | 2/2014 | Schneider | A61B 1/00124 | |
| | | | 348/82 | |
| 2006/0060021 A1 * | 3/2006 | Riwan | B25J 9/107 | |
| | | | 74/490.04 | |
| 2011/0178727 A1 * | 7/2011 | Hafenrichter | G01M 5/0016 | |
| | | | 702/38 | |
| 2011/0275480 A1 * | 11/2011 | Champsaur | A63B 21/0058 | |
| | | | 482/4 | |
| 2011/0280472 A1 * | 11/2011 | Wallack | B25J 9/1692 | |
| | | | 382/153 | |
| 2011/0295426 A1 | 12/2011 | Georgeson et al. | | |
| 2011/0295427 A1 | 12/2011 | Motzer et al. | | |
| 2012/0328395 A1 * | 12/2012 | Jacobsen | B25J 3/04 | |
| | | | 414/1 | |
| 2013/0231682 A1 * | 9/2013 | Barwinkel | A61B 1/00135 | |
| | | | 606/130 | |
| 2013/0289766 A1 * | 10/2013 | Hafenrichter | B25J 9/02 | |
| | | | 700/245 | |

* cited by examiner

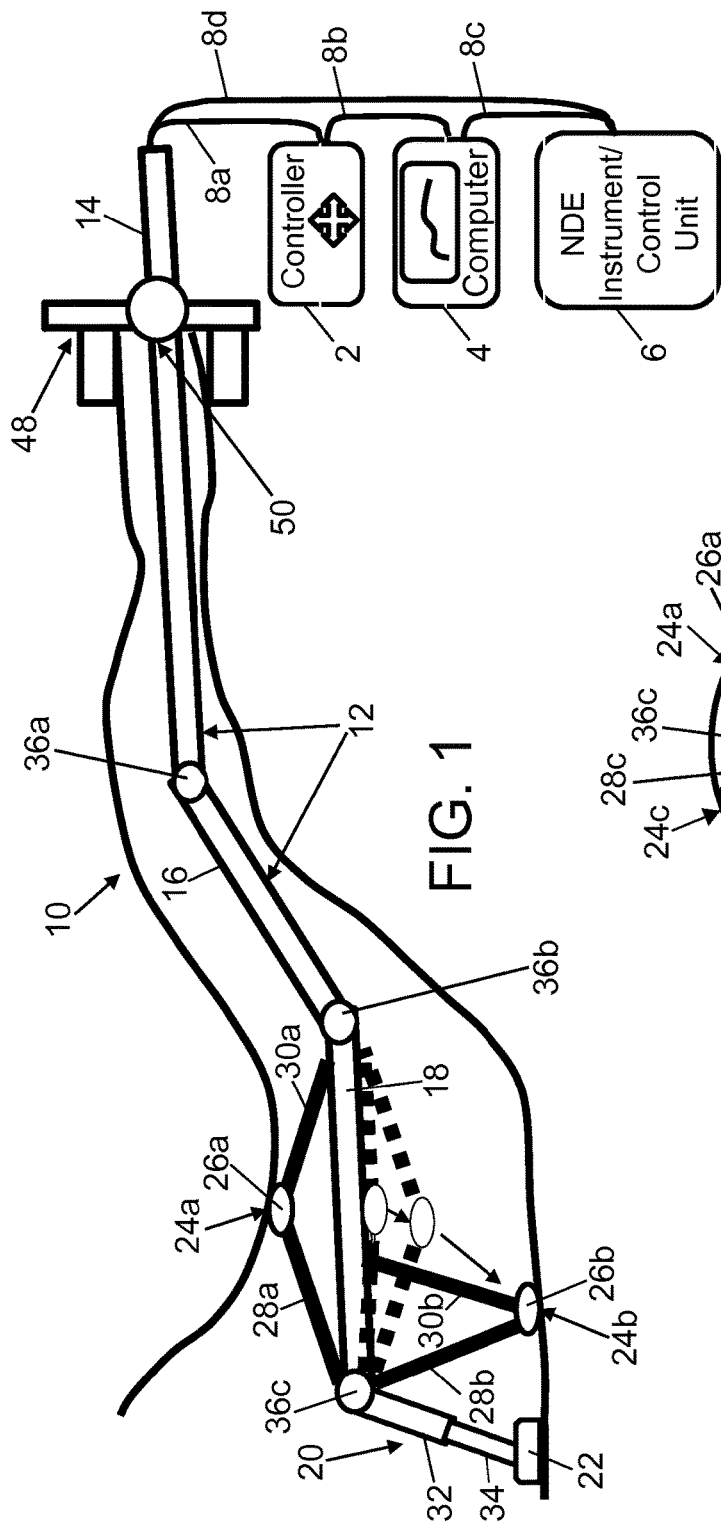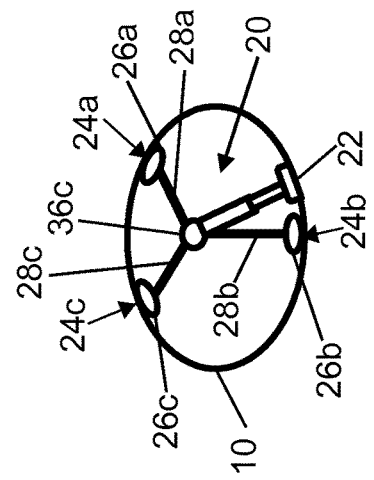

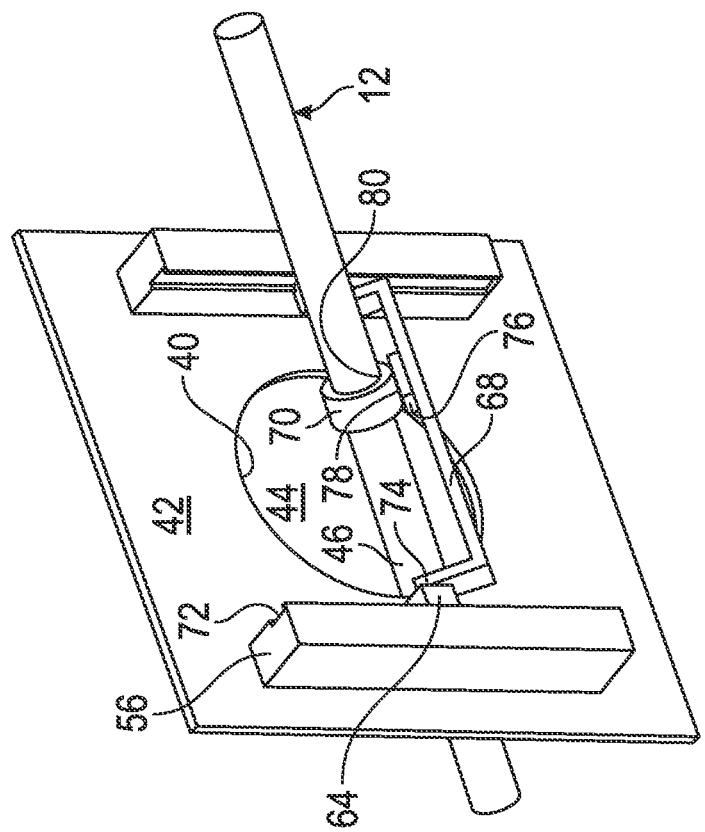
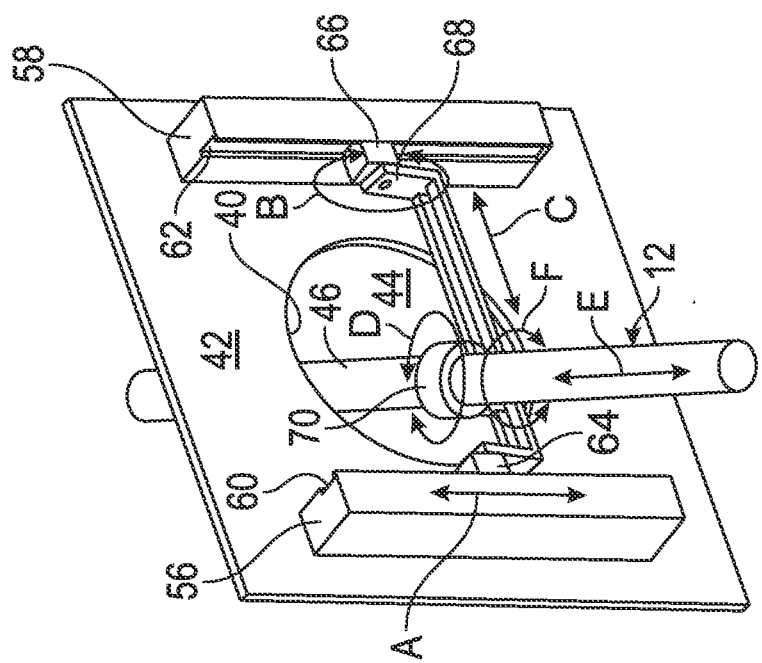

STABILIZATION OF AN END OF AN EXTENDED-REACH APPARATUS IN A LIMITED-ACCESS SPACE

BACKGROUND

This disclosure relates to systems and methods for performing maintenance operations in a limited-access space using an extended-reach apparatus.

The present disclosure relates generally to the field of automated maintenance (including non-destructive inspection) performed inside a limited-access space of a hollow structure, such as an aircraft exhaust duct, a large gun barrel, or a wing box of an aircraft. As used herein, the term "maintenance" includes, but is not limited to, operations such as nondestructive inspection, drilling, scarfing, grinding (e.g., to remove bonded or bolted components), fastening, appliqué application, ply mapping, depainting, cleaning and painting.

Known aircraft and artillery generally undergo routine maintenance, including inspection and/or repair of various components. As a result, structural health monitoring, including a scheduled and detailed inspection of components, of aircraft and artillery is a growing field. However, because of various spatial restrictions, physical and/or visual access to at least some of these components may be relatively difficult. For example, access to at least some components calls for disassembly of at least one occluding structure and/or removal of the component for evaluation and/or maintenance of the component. As such, maintenance of at least some components may be time consuming and/or costly. Additionally, the disassembly and/or reassembly of such structures to perform maintenance activities may reduce a lifespan and/or reliability of the structure and/or component.

It is known to use a manipulator arm and a tool-carrying extender to reach into a limited-access space and to aid tool placement on or near areas within the limited-access space. A controlled multi-jointed arm is another solution, but a multi-jointed arm may fail when the distance required goes beyond about seven feet due to a loss of positional and orientational control at the distal end of the arm.

Apparatus capable of solving the difficult problem of stabilization, positioning and control of sensors and small tools at the end of extremely long (e.g., greater than about seven feet) extended-reach tools or robotic arms, when work in a limited-access space is a significant distance from an access hole, would be useful in many different applications.

SUMMARY

The subject matter disclosed herein is directed to apparatus and methods that can be used to stabilize a portion of an extended-reach tool assembly to enable the dimensional mapping, non-destructive inspection (NDI) (a.k.a. non-destructive evaluation (NDE)), and/or simple repair of elongated and serpentine structures used in aerospace and military platforms. In some embodiments, a jointed (i.e., articulated) arm of the extended-reach tool assembly, which is mounted and manipulated at the entrance to a limited-access space (e.g., a cavity), is equipped with actuatable contact pads or bladders to stabilize the distal end of the arm to which a tool-carrying end effector is coupled. (As used herein, the term "end effector" means the last link of a robot; at which endpoint a maintenance tool is attached.) The end effector is capable of holding and orienting a probe or sensor (e.g., NDI sensor unit, laser scanner, camera, etc.) or other tool (e.g., drill, sander, vacuum, "grabber", coating sprayer, etc.). The apparatus disclosed in detail hereinafter can extend a technician's working distance back into a duct, barrel or pipe at a reasonable cost and in an acceptable time, while avoiding the time and costs associated with general disassembly of the structure being serviced.

In accordance with various embodiments, the extended-reach tool assembly may comprise the following features:

(1) An articulated or non-articulated arm that can be inserted through the access end of an exhaust duct, pipe, or barrel. The joints can be motorized using off-the-shelf stepper motors. The number of joints depends on the application. A miniature camera is mounted toward the end of the arm to provide situational awareness.

(2) A stabilizing apparatus mounted to the arm near the end effector. The stabilizing apparatus is actuated by the technician once the distance into the limited-access space has been selected. In accordance with one embodiment, the stabilizing apparatus comprises a multiplicity of contact pads that are extended outward into abutment with the internal surface of the structure being serviced in order to stabilize a portion of the arm near the end effector. In accordance with another embodiment, the stabilizing apparatus comprises a multiplicity of bladders that are expanded against the internal surface of the structure being serviced in order to stabilize a portion of the arm near the end effector. The stabilizing apparatus can be deployed at one location, retracted, moved, and re-deployed at a new location during inspection or repair activities.

(3) An end effector coupled to the distal end of the arm and having rotational and extensional capability using in-line motor drives.

(4) A set of interchangeable detachable maintenance tools, each of which is selectively mountable on the end effector. Each maintenance tool incorporates elements to perform its intended function. Some examples of suitable maintenance tools include, but are not limited to, the following: (a) a video camera and a source of light to enable visual inspection for damage inside the limited-access space; (b) an NDI sensor unit (e.g., an array of ultrasonic transducers, an eddy current probe, microwave sensors, etc.); (c) a laser line scanner or a three-dimensional mapping head for dimensional measurement or mapping damage at a location; (d) other sensor or sensor array; (e) a mini-sander or grinder to remove material during a repair; (f) a vacuum to pick up foreign object damage or repair debris; (g) a spray head for painting or coating a repaired area; and (h) other tools for maintenance or repair.

In addition, the extended-reach tool assembly with stabilizing apparatus may comprise one or more of the following: (5) a controller box with separate controls for motorized joints, camera(s), and end effector; (6) a computer with visual display of camera image, sensor data, and orientation of the control arm and end effector; and (7) an NDI instrument that drives the NDI sensor unit or a control unit for individual maintenance power tools. The extended-reach tool assembly with stabilizing apparatus may optionally further comprise linear and rotational positional control and measurement of the arm for calculating the location (position and orientation) of a stabilized distal end of the arm using a gimbal assembly mounted to an access hole or a floor-attached base.

One aspect of the subject matter disclosed in detail below is an extended-reach tool assembly comprising: an arm; an end effector coupled to the arm; and a plurality of extendible or expandable stabilizers mounted to the arm, wherein each of the stabilizers can be actuated to transform from a first configuration, in which a portion of the stabilizer is a first radial distance from the arm, into a second configuration, in which the portion of the stabilizer is a second radial distance from the arm, the second radial distance being greater than the first radial distance. Any one of a variety of tools can be attached to the end effector. This extended-reach tool assembly may further comprise a pressure switch arranged to measure an external pressure exerted on one of the stabilizers during actuation and configured to issue an output signal in response to the measured pressure equaling or exceeding a preset threshold.

In accordance with some embodiments, each of the stabilizers comprises a respective link assembly and a respective contact pad supported by the respective link assembly. Each link assembly comprises first and second links which are pivotably coupled to each other. In one implementation, the contact pad is pivotably coupled to the link assembly.

In the same or a different implementation, the extended-reach tool assembly further comprises: a support block affixed to the arm, the first link having one end which is pivotably coupled to the support block; a carriage which is translatable along the arm and comprises a nut, the second link having one end which is pivotably coupled to the carriage; and a lead screw rotatably coupled to the support block and threadably coupled to the nut, wherein the contact pad is movable from a first position at the first distance to a second position at the second distance in response to rotation of the lead screw in one direction, and is movable from the second position to the first position in response to rotation of the lead screw in a direction opposite to the one direction.

In accordance with other embodiments, the stabilizers comprise respective bladders attached to the arm.

In accordance with another aspect of the subject matter disclosed in detail below, a system is provided which comprises: a hollow structure containing a limited-access space and having an opening; an extended-reach tool assembly that extends through the opening and into the limited-access space, wherein the extended-reach tool assembly comprises: an arm having a proximal portion and a distal portion; an end effector coupled to the distal portion of the arm and disposed in the limited-access space; and a plurality of stabilizing devices mounted to the distal portion of the arm and actuatable for stabilizing the distal portion of the arm by contact with the hollow structure in a plurality of contact areas.

A further aspect of the subject matter disclosed in detail below is a method for performing a maintenance function in a limited-access space of a hollow structure, comprising: (a) inserting a portion of an extended-reach tool assembly through an opening in the hollow structure until an end effector of the extended-reach tool assembly is located in the limited-access space; (b) actuating a plurality of stabilizing devices of the extended-reach tool assembly to cause the stabilizing devices to move into contact with an internal surface of the hollow structure in respective contact areas; and (c) actuating the end effector to move to a target location while the portion of the extended-reach tool assembly is stable. The method may further comprise actuating a tool mounted to the end effector while the portion of the extended-reach tool assembly is stable and the end effector is at the target location.

Other aspects of systems and methods for stabilizing a portion of an extended-reach apparatus remotely located in a limited-access space are disclosed and claimed below.

BRIEF DESCRIPTION OF THE DRAWINGS

FIG. 1 is a diagram representing a side view of an apparatus extending into a limited-access space with a portion thereof stabilized by extendible contact pads in accordance with one embodiment.

FIG. 2 is a diagram representing an end view of the extendible contact pads and tool-carrying end effector depicted in FIG. 1.

FIGS. 10A and 10B are diagrams representing isometric views of a gimbal assembly with encoders for attaching a proximal end of an extended-reach tool assembly to a bulkhead access port or other aperture in a structure being serviced (disclosed in U.S. patent application Ser. No. 13/750,565 filed on Jan. 25, 2013, which is assigned to the assignee of the instant application).

Reference will hereinafter be made to the drawings in which similar elements in different drawings bear the same reference numerals.

DETAILED DESCRIPTION

Figure 3:
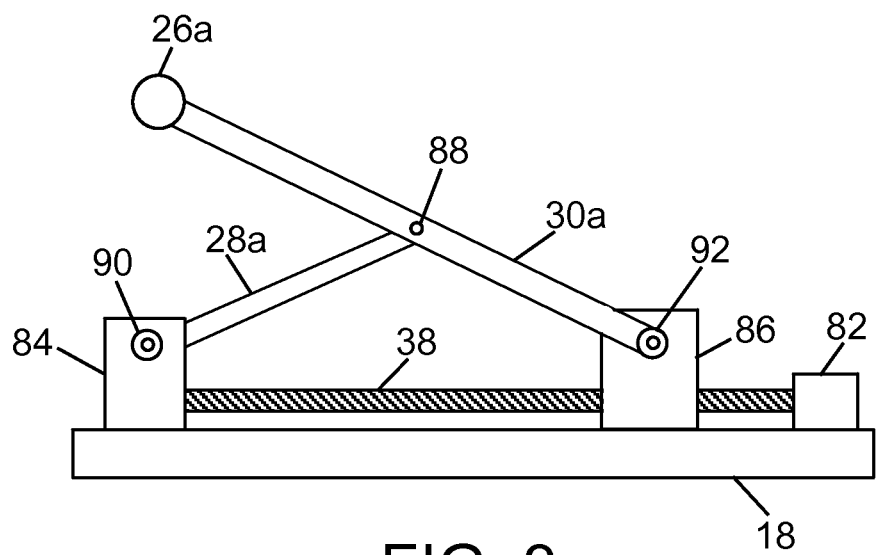
FIG. 3 is a diagram representing a side view of some components of a lead screw assembly for extending a spherical or circular cylindrical contact pad in accordance with one implementation.

The apparatus and methods disclosed in detail hereinafter can be used to stabilize a portion of an extended-reach tool assembly to enable dimensional mapping, non-destructive inspection (NDI) and/or simple repair inside elongated and serpentine structures used in aerospace and military platforms. For example, such apparatus could be employed in the mapping and NDI of coatings on aircraft exhaust ducts. Inspection areas in such exhaust ducts may be up to fourteen feet from the entrance and along a serpentine path. In another example, such apparatus could be employed in the mapping and NDI of large gun barrels, to find, quantify, and map interior cracks. While the path is straight inside a gun barrel, there is still a need to precisely control the position of a sensor a long distance from the entrance. A third exemplary application is extended-reach eddy current inspection in the center wing box of an aircraft. While the distance to the inspection area in this third example is about eight feet, stabilization of the tool at that end may be required as well.

For the purpose of illustration, an extended-reach tool assembly with extendible stabilizers, suitable for performing a maintenance function inside an exhaust dust of an aircraft, will now be described with reference to FIGS. 1 and 2.

FIG. 1 is a diagram representing a side view of an extended-reach tool assembly installed in an exhaust duct 10. The extended-reach tool assembly comprises: an articulated arm 12 comprising three arm segments 14, 16, 18 pivotably coupled in series; an end effector 20 pivotably coupled to the distal end of arm 12; a detachable maintenance tool 22 coupled to the end effector 20; and three extendible stabilizing finger assemblies 24a-24c mounted to arm segment 18. To avoid clutter in the drawing, the side view of FIG. 1 shows only two extendible stabilizing finger assemblies 24a and 24b. Three extendible stabilizing finger assemblies 24a-24c can be seen in the end view of FIG. 2. The stabilizing finger assemblies 24a-24c comprise respective contact pads 26a-26c, described in more detail below.

During the process of inserting the extended-reach tool assembly into the exhaust duct 10, the stabilizing finger assemblies 24a-24c will be in a retracted state. FIG. 1 shows the stabilizing finger assembly 24b in a retracted position (dashed lines), a first extended position (dashed lines) and a second (further) extended position (solid lines) with arrows indicating the direction of movements of the contact pad 26b as stabilizing finger assembly 24b extends. The stabilizing finger assemblies 24a and 24c are shown extended in FIG. 1. When the three stabilizing finger assemblies 24a-24c are extended to cause the contact pads 26a-26c to impinge on and exert sufficient force against the contacted areas of the internal surface of the exhaust duct 10 (see FIG. 2), the distal end of arm segment 18 will be unable to move, i.e., stabilized.

In the installed and stabilized state shown in FIG. 1, the arm segment 14 is coupled to a base mount 48, which is attached to the exhaust duct 10 at an access end thereof. In alternative embodiments, the arm segment 14 could be coupled to a pedestal that sits on a floor nearby and not attached to the exhaust duct 10. Optionally, the arm segment 14 can coupled to the base 48 by means of a positional and rotational control assembly 50 which allows the proximal end of arm segment 14 (which extends through the access hole and outside the exhaust duct 10) to be manipulated by a technician. The base mount 48 and the extending stabilizing finger assemblies 24a-24c, in combination, can maintain the articulated arm 12 in a stable position in the absence of pivoting of one arm segment relative to another arm segment.

In the embodiment shown in FIG. 1, the articulated arm 12 comprises a first arm segment 14, a second arm segment 16 pivotably coupled to arm segment 14 by means of a multi-axis pivotable coupling 36a having at least two degrees of rotational freedom; and a third arm segment 18 pivotably coupled to arm segment 16 by means of a multi-axis pivotable coupling 36b having at least two degrees of rotational freedom. The end effector 20 comprises a first member 32, which is pivotably coupled to the third arm segment 18 by means of a pivotable coupling 36c having at least two degrees of rotational freedom, and a second member 34, which is axially translatable relative to the first member of end effector 20 by any conventional axial translation means, such as linear guides or telescoping. A maintenance tool 22 is coupled to a distal end of the second member 34. Optionally, the maintenance tool 22 is pivotably coupled to the second member of end effector 20 by means of a pivotable coupling (not shown) having at least one degree of rotational freedom.

In accordance with one embodiment, the multi-axis pivotable couplings 36a-36c can be coupled to respective sets of motors (not shown) by means of respective sets of gear trains (not shown) in a well-known manner. During insertion and set-up of the extended-reach tool assembly inside the exhaust duct 10, the arm segments can be pivoted as needed. Pivoting of one arm segment relative to another (e.g., arm segment 16 pivoting relative to arm segment 14 or arm segment 18 pivoting relative to arm segment 16) and pivoting of the end effector 20 relative to arm segment 18 can be actuated by operation of associated motors under the control of a controller 2 having a user interface. Likewise extension/retraction of the stabilizing finger assemblies 24a-24c and translation of the second member 34 of the end effector 20 relative to the first member 32 can be actuated by operation of associated motors using the user interface of the controller 2. The controller 2 is electrically coupled to the motors by means of an electrical cable 8a.

During the installation procedure, the extended-reach tool assembly may be inserted into the exhaust duct 10 through an opening at the access end thereof, the end effector 20 and third arm segment 18 being inserted first and moved further into the exhaust duct 10 until the area inside the exhaust duct 10 to be serviced is within the deployment range of the maintenance tool 22. As the extended-reach tool assembly is being inserted into the exhaust duct 10, the arm segments can be selectively pivoted relative to each other in order to steer the extended-reach tool assembly as it is moved along the exhaust duct 10, with the goal of avoiding impingement of the tool assembly against the internal surface of the exhaust duct 10. When the internal area to be serviced is within the deployment range of the maintenance tool 22, the arm segment 14 can be coupled to the base mount by assembly of the positional and rotational control assembly 50.

Once the arm segment 14 is supported by the base mount 48, the position and orientation of arm segment 14 can be adjusted, which in turn adjusts the location of the distal end of arm segment 18 (to which the end effector 20 is coupled). When the latter is in a suitable location for deployment of the stabilizing finger assemblies 24a-24c, the latter can be extended to stabilize the distal end of the articulated arm 12, as seen in FIG. 1.

In accordance with the embodiment depicted in FIGS. 1 and 2, each of the stabilizing finger assemblies 24a-24c comprises a respective link assembly and a respective contact pad coupled to and supported by a respective link assembly. As depicted in FIG. 1, the link assembly of stabilizer 24a, which supports contact pad 26a, comprises a first link 28a and a second link 30a which are pivotably coupled to each other; the link assembly of stabilizer 24b, which supports contact pad 26b, comprises a first link 28b and a second link 30b which are pivotably coupled to each other; and the link assembly of stabilizer 24c, which supports contact pad 26c, comprises a first link 28c and a second link 30c which are pivotably coupled to each other. The contact pads 26a-26c are arranged such that they will contact and bear against the internal surface of the exhaust duct 10 when the stabilizing finger assemblies 24a-24c are extended radially outward by respective distances dependent on the geometry of the exhaust duct 10 in the areas of contact. A system operator can remotely control the respective extensions of the stabilizing finger assemblies 24a-24c (via the user interface of controller 2) to achieve stabilization of the distal end of the third arm segment 18. Once the distal end of the third arm segment 18 has been stabilized, then the system operator can remotely deploy the end effector 20, again via the user interface of the controller 2.

When the extended-reach tool assembly is stabilized and the maintenance tool 22 is in its starting position, the maintenance operation can be initiated by the system operator using a user interface (not shown in FIG. 1) connected to a computer 4. The computer 4 is electrically coupled to the controller 2 by an electrical cable 8b and to a maintenance tool control unit 6 by an electrical cable 8c. In cases where the maintenance tool is an NDI sensor unit, the control unit 6 may be an NDI instrument (e.g., an ultrasonic pulser/receiver unit). The control unit 6 is electrically coupled to the maintenance tool 22 by an electrical cable 8d. In accordance with one embodiment, the arm segments 14, 16 and 18 are hollow tubes and the electrical cables 8a and 8d pass through the hollow centers of those tubes. In the case of ultrasonic inspection, water (used as an acoustic couplant) may be provided to the ultrasonic inspection unit from a source of water by way of a water cable which also passes through the hollow arm segments. Alternatively, the cables may be attached to the exterior of arm segments 14, 16 and 18.

The maintenance tool 22 may comprise one of the following: an NDI sensor unit, a laser scanner, a camera, a drill or other rotary tool (such as a sander, scarier or grinder), a ply mapper, a squirter, a sprayer, a wiper, and a continuous cleaning device. The stabilization apparatus disclosed herein enables positioning, orienting and scanning of the end effector 20 with sufficient precision to accurately cover an area with geometric mapping, NDI, and even coating repair.

Any one of the extendible stabilizing finger assemblies 24a-24c can be actuated to transform from a first configuration, in which a contact pad is a first radial distance from arm segment 18, into a second configuration, in which the same contact pad is a second radial distance from arm segment 18, the second radial distance being greater than the first radial distance. The distance traveled by each contact pad until impingement upon the internal surface of the exhaust duct 10 will depend on the geometry of that internal surface.

In accordance with one embodiment, V-shaped stabilizing finger assemblies 24a-24c are actuated by respective motor-driven lead screw assemblies (not shown in FIG. 1). The contact pads 26a-26c are respectively coupled to the vertices of the stabilizing finger assemblies 24a-24c. In accordance with an alternative embodiment, one link of each stabilizing finger assembly extends beyond the pivot joint which couples the paired links and the contact pad is coupled to the end of that extended link. One implementation of such an alternative embodiment will now be described with reference to FIG. 3. The stabilizing apparatus for an extended-reach tool assembly may comprise three stabilizing finger assemblies of the type depicted in FIG. 3.

FIG. 3 represents a side view of a stabilizing finger assembly comprising the following components: a support block 84 affixed to the arm segment 18; a first link 28a having one end which is pivotably coupled to the support block 84; a carriage 86 which is translatable along a linear track (not shown) attached to the arm segment 18 and comprises a nut (not shown); an extended second link 30a having one end which is pivotably coupled to the carriage 86; a lead screw 38 rotatably coupled to the support block 84 and threadably coupled to the aforementioned nut; a motor 82 (e.g., a programmable stepper motor) mounted to arm segment 18 and coupled to drive rotation of the lead screw 38; and a spherical or circular cylindrical contact pad 26a attached to a distal end of link 30a. The carriage 86 travels along the arm segment 18 by means of a linear guide unit comprising a linear guide track (not shown) attached to the arm segment 18 and a slider (not shown) attached to the carriage 86. The slider may comprise a pair of recirculating ball bearings, the balls of which roll along the linear guide track. Optionally, the position of the carriage 86 can be measured by a position sensor (e.g., an encoder) to provide feedback to the controller 2 (see FIG. 1), which controls the motor 82. The contact pad 26a is movable from a first position at a first distance from arm segment 18 to a second position at a second distance from arm segment 18 in response to rotation of the lead screw 38 in one direction, and is movable from the second position to the first position in response to rotation of the lead screw 38 in a direction opposite to the one direction.

In the embodiment depicted in FIG. 3, the first link 28a has a length half that of the extended second link 30a. The first link 28a is attached to a revolute joint 88 midway along the length of the second link 30a. [A revolute joint (also called pin joint or hinge joint) is a one-degree-of-freedom kinematic pair used in mechanisms. Revolute joints provide single-axis rotation.] The other end of the first link 28a is pivotably coupled to support block 84 by a revolute joint 90, and one end (referred to herein as the proximal end) of the drive link 30a is pivotably coupled to the carriage 86 through a revolute joint 92. The carriage 86 moves revolute joint 90 towards or away from joint 88. The motion path of carriage 86 is a straight line defined by the axis of lead screw 38. In this configuration, the motion of the proximal end of the second link 30a causes orthogonal motion of the contact pad 26a relative to the motion of the carriage 86.

In the embodiment depicted in FIG. 3, the contact pad 26a is mounted on the distal end of the second link 30a. In one implementation, the contact pad 26a is a spherical or circular cylindrical pad made of rubber or other suitable material. During operation, as the proximal end of the second link 30a is driven by lead screw 38 from one end point of travel to the other, the motion of contact pad 26a will be transverse to the axis of the lead screw 38 (i.e., transverse to arm segment 18). However, persons skilled in the art will recognize that the length of the extended second link 30a may be different than twice the length of the first link 28a, in which case the motion of the contact pad will not be transverse to the arm segment 18. The contact pad 26a should be sized so that when it contacts the internal surface of the structure being serviced, the second link 30a does not contact the internal surface.

In accordance with alternative implementations, each contact pad may comprise a flat contact surface and be pivotably coupled to a link or link assembly to allow the orientation of that flat contact surface to adjust to the angle of the contacted surface.

Figure 3A:
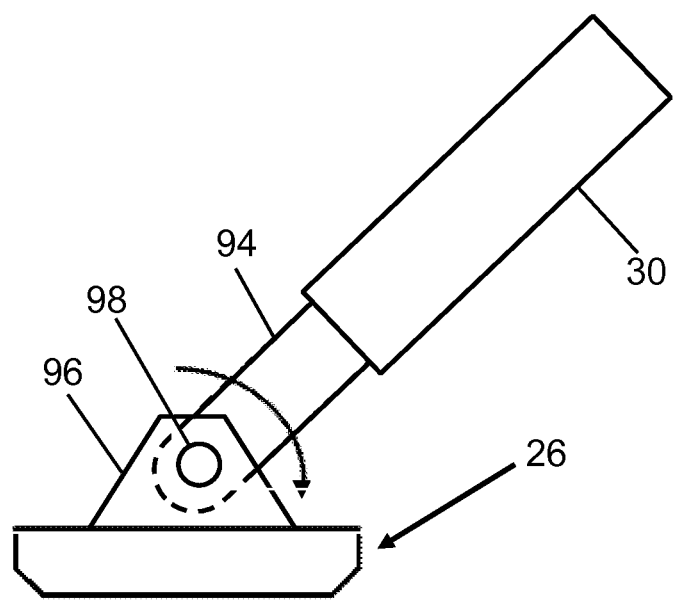
FIGS. 3A and 3B are diagrams representing side views of a flat contact pad capable of adjusting its orientation as a function of the angle of a contacting surface in accordance with further implementations.

FIG. 3A represents a side view of a rubber contact pad 26 capable of adjusting its orientation as a function of the angle of its flat contact surface. In this implementation, the contact pad 26 is pivotably coupled to a tang 94 at the end of a link 30 by means of a clevis 96 and a clevis pin 98.

Figure 3B:
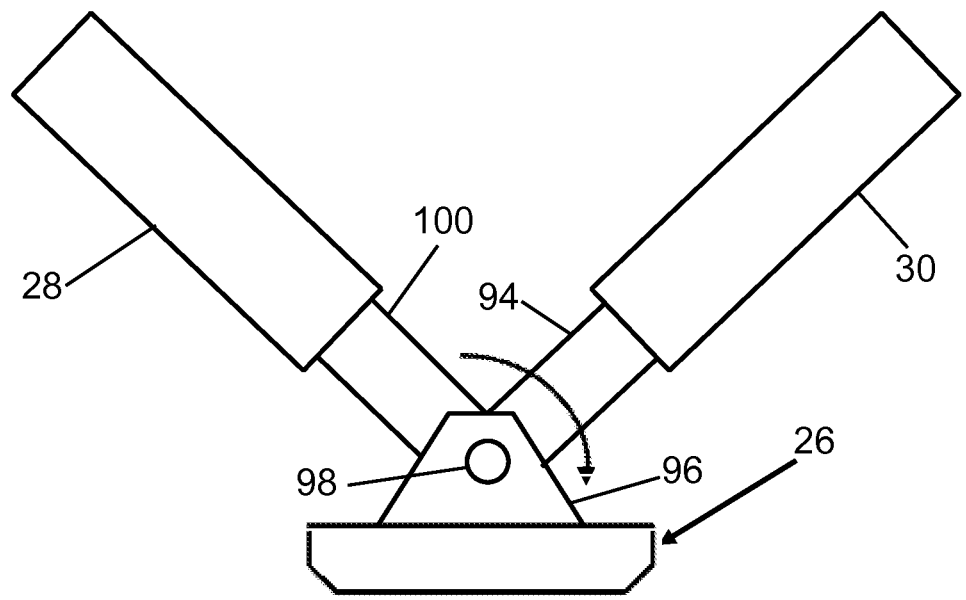

FIG. 3B represents a side view of another rubber contact pad 26 capable of adjusting its orientation as a function of the angle of its flat contacting surface. In this implementation, the contact pad 26 is pivotably coupled to a tang 94 at the end of a link 30 and to a tang 100 of a link 28 by means of a clevis 96 and a clevis pin 98.

Figure 4:
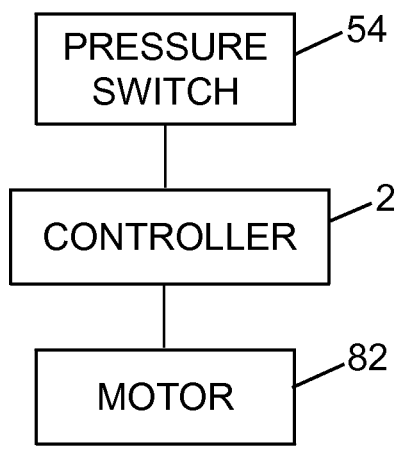
FIG. 4 is a block diagram indicating the incorporation of pressure sensors in the stabilization system depicted in FIG. 1.

Each contact pad may be equipped with a respective pressure switch. A pressure switch is a form of switch that closes an electrical contact when a certain set pressure as been reached on its input. The switch may be designed to make contact on pressure rise. The set pressure of the pressure switch may be adjustable. FIG. 4 is a block diagram indicating the incorporation of pressure switches in the stabilization system depicted in FIG. 1. Each pressure switch 54 is arranged to measure an external pressure exerted on each contact pad during actuation of the corresponding stabilizing finger assembly. Each pressure switch is configured to issue an output signal to the controller 2 in response to the measured pressure equaling or exceeding a preset threshold. The controller 2 is programmed to turn off the motor 82 in response to the signal representing an undesirably high pressure being exerted on the internal surface of the structure being serviced. Pressure switches in the pads prevent over-driving of the stabilizing finger assemblies and damage to the structure or its coating.

Once the extended-reach tool assembly has been stabilized (as shown in FIG. 1), the end effector 20 can be rotated to a starting orientation for performing a maintenance operation. As previously mentioned, the end effector 20 is pivotably coupled to the distal end of arm segment 18 and has at least two degrees of rotational freedom. The maintenance tool 22 is coupled to the distal end of the end effector 20. The end effector 20 is also extendible/retractable to facilitate proper placement of the maintenance tool relative to the internal surface of the exhaust duct 10.

Figure 5:
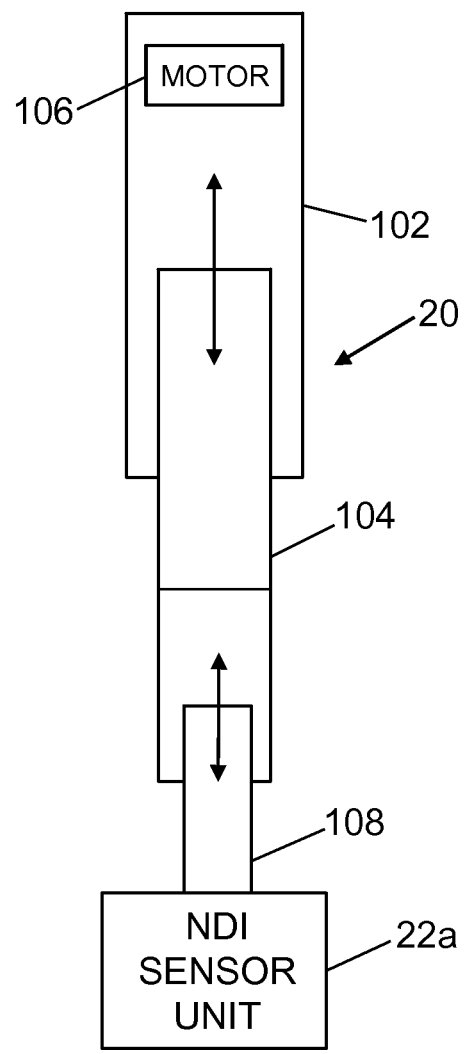
FIG. 5 is a diagram representing an elevation view of an extendible end effector carrying an NDI sensor unit in accordance with one embodiment.

The end effector 20 may take the form of a telescoping arm pivotably coupled to the distal end of arm segment 18. One embodiment of an end effector 20 that carries an NDI sensor unit 22a is shown in FIG. 5. The telescoping arm of end effector 20 comprises an outer sleeve 102 and an inner sleeve 104 which is axially translatable inside the outer sleeve 102. Linear motion of the inner sleeve 104 can be actuated via hydraulics, pneumatics, or a motor turning a threaded screw. In the embodiment shown in FIG. 5, the linear motion actuator comprises a lead screw (not shown) coupled to the output shaft of a motor 106 (for example, a stepper motor) and threadably coupled to a nut (not shown) attached to the inner sleeve 104. In response to activation of motor 106, the inner sleeve 104 and the NDI sensor unit 22a coupled to inner sleeve 104 can be retracted during insertion of the extended-reach apparatus into a limited-access space and later extended to allow the system operator to set the nominal length.

In accordance with a further feature, the NDI sensor unit 22a can be spring loaded to account for variation in the internal surface (i.e., inner mold line) that bounds the limited-access space. More specifically, the NDI sensor unit 22a can be coupled to the inner sleeve 104 by means of a compliant support structure 108 that both urges the shoe (not shown) of the NDI sensor unit 22a toward the inner mold line (IML) bounding the limited-access space and flexes to allow the NDI sensor unit 22a to adjust its position to take into account variations in the IML and minor misalignments. For example, the compliant support structure 108 may take the form of flexible couplings. In accordance with one implementation, each flexible coupling may take the form of an aluminum rod having a spiral slot cut through the length of the aluminum tube to form a helical coil in a center section that acts as a spring. The flexure allowed by the center portion of the coupling accommodates angular, parallel and axial misalignment between the inner sleeve 104 and the shoe of the NDI sensor unit 22a. Such flexible couplings are commercially available from Lovejoy, Inc., Downers Grove, Ill. Further details concerning use of such flexible couplings to provide compliant motion of an NDI sensor unit relative to a variable scanned surface can be found in U.S. patent application Ser. No. 13/975,599 entitled "Apparatus for Non-Destructive Inspection of Stringers".

For the purpose of further illustration, an extended-reach tool assembly with expandable stabilizers, suitable for performing a maintenance function inside an exhaust dust of an aircraft, will now be described with reference to FIGS. 6 and 7.

Figure 6:
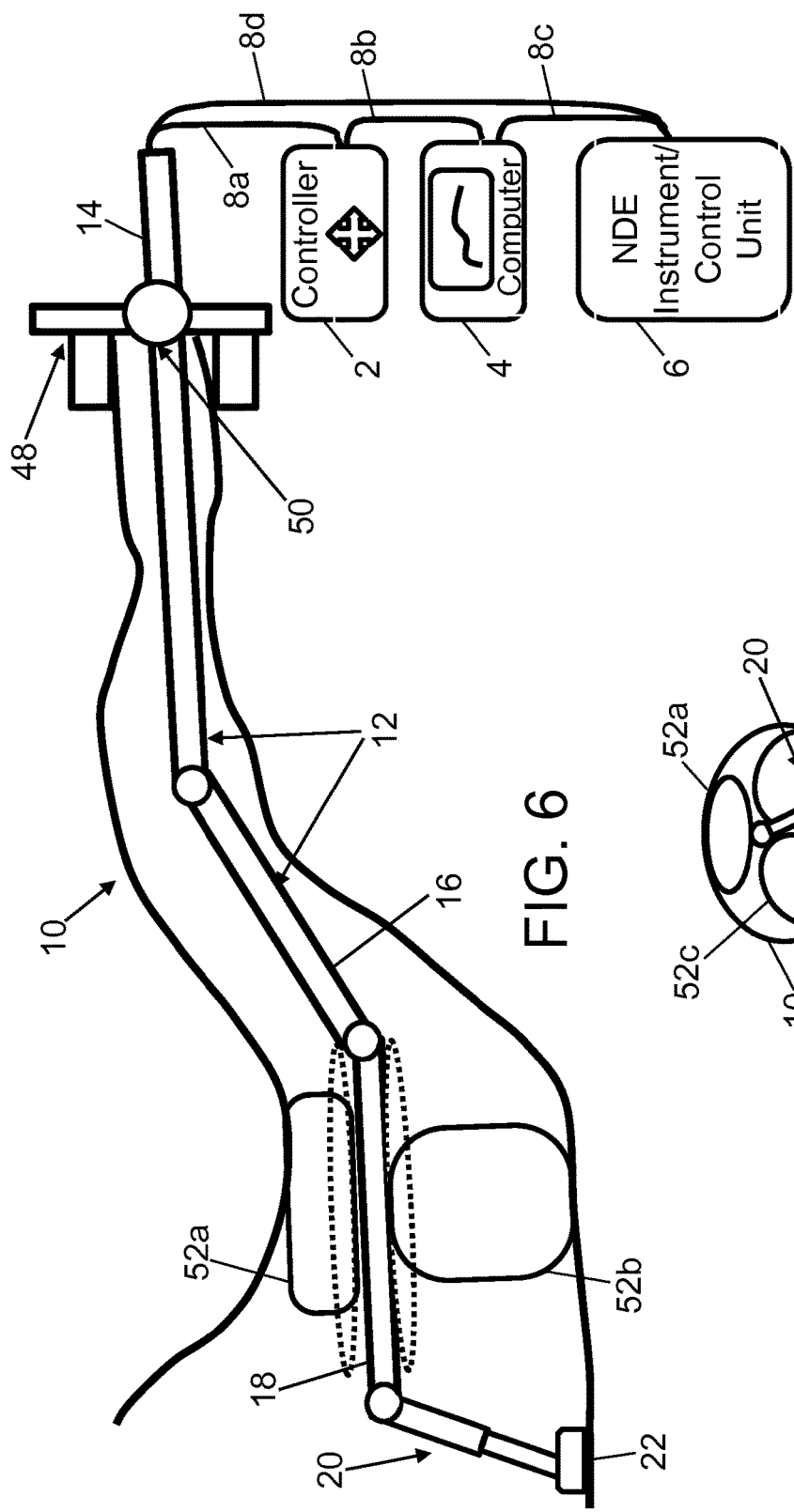
FIG. 6 is a diagram representing a side view of an apparatus extending into a limited-access space with a remote portion thereof stabilized by bladders in accordance with an alternative embodiment.
Figure 7:
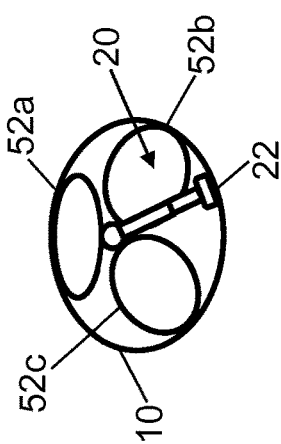
FIG. 7 is a diagram showing an end view of the bladders and tool-carrying end effector of the apparatus depicted in FIG. 6.

FIG. 6 is a diagram representing a side view of an extended-reach tool assembly installed in an exhaust duct 10. The extended-reach tool assembly comprises: an articulated arm 12 comprising three arm segments 14, 16, 18 pivotably coupled in series; an end effector 20 pivotably coupled to the distal end of arm 12; a detachable maintenance tool 22 coupled to the end effector 20; and three bladders 52a-52c mounted to arm segment 18. To avoid clutter in the drawing, the side view of FIG. 6 shows only two bladders 52a and 52b. Bladders 52a and 52b are shown inflated (solid lines) and deflated (dotted lines) in FIG. 6. Three inflated bladders 52a-52c are shown in the end view of FIG. 7.

During the process of inserting the extended-reach tool assembly into the exhaust duct 10, the bladders 52a-52c will be in a deflated state. When the distal end of the arm segment 18 is in proximity to the area to be serviced, the bladders 52a-52c can be selectively or concurrently inflated under the control of the system operator. When the three bladders 52a-52c are inflated to exert sufficient pressure in respective contacted areas of the internal surface of the exhaust duct 10 (see FIG. 7), the distal end of arm segment 18 will be unable to move, i.e., stabilized.

Figure 8:
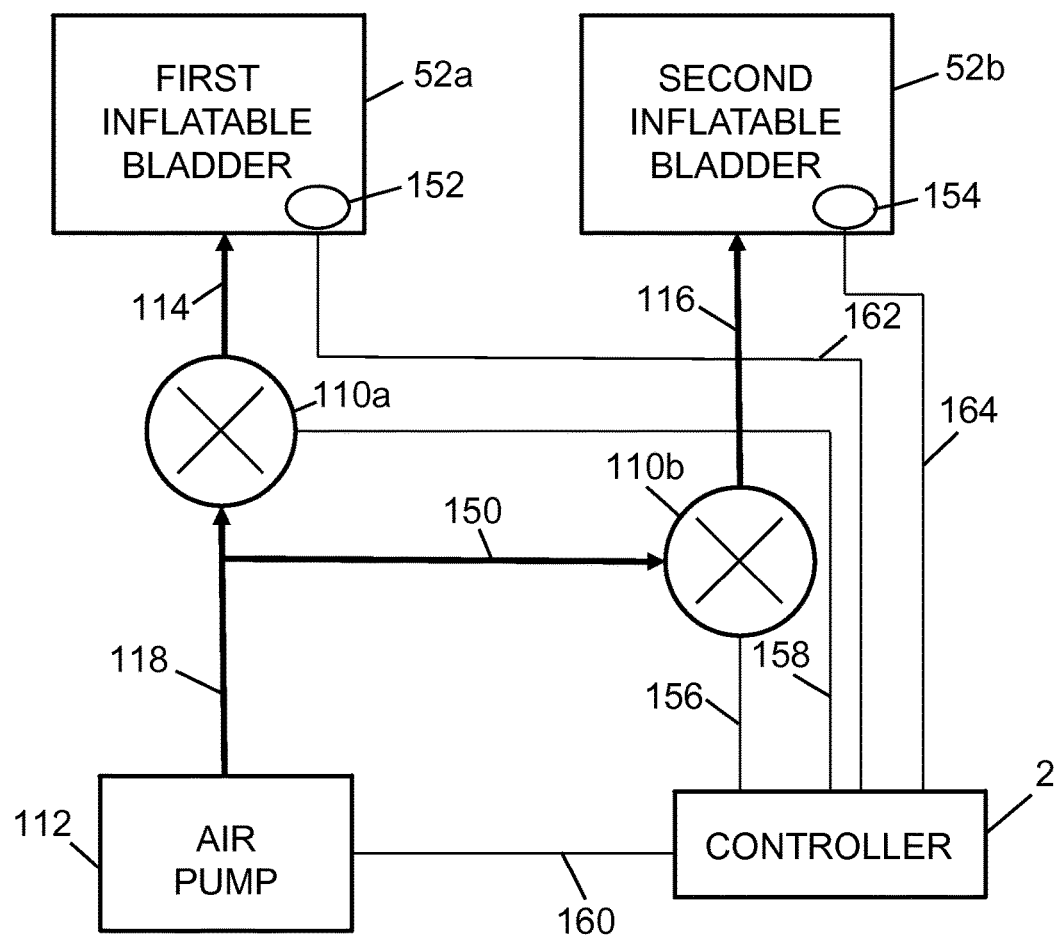
FIG. 8 is a block diagram showing additional components of the pneumatic stabilization system partly depicted in FIG. 6.

FIG. 8 shows a pneumatic actuation system for inflating at least two bladders in accordance with one embodiment. First and second bladders 52a and 52b are connected to respective first and second electrically controllable valves 110a and 110b via respective tubes 114 and 116. The first and second electrically controllable valves 110a and 110b are in turn connected to an air pump 112 via tubes 118 and 150. Although FIG. 8 shows only first and second bladders 52a and 52b connected to respective first and second electrically controllable valves 110a and 110b, it should be appreciated that this stabilization system preferably comprises a third bladder connected to a third electrically controllable valve (not shown), which is in turn connected to air pump 112.

The controller 2 can control the states of the electrically controllable valves 110a and 110b by sending electrical control signals via electrical connections 156 and 158 respectively. The controller 2 can further control the state of the air pump 112 by sending turn-on and turn-off signals via electrical connection 160. The electrical connections 156, 158 and 160 may comprise respective electrical cables.

In a first stage of one exemplary stabilization procedure, the controller 2 opens the first valve 110a and closes the second valve 110b and then activates the air pump 112 to inflate the first bladder 52a. The boldface arrows in FIG. 8 indicate airflow through pneumatic connections, while the lines intersecting the controller 2 indicate electrical connections. In a second stage of this exemplary stabilization procedure, the controller 2 closes the first valve 110a and opens the second valve 110b while the air pump 112 is still activated to inflate the second bladder 52b. The controller 2 can be programmed to activate the air pump and open or close the respective valves upon receipt of a command entered by the system operator via any conventional user interface (e.g., a keypad, a gamepad, a graphical user interface displayed on a screen, etc.). The subsystem shown in FIG. 8 may further comprise respective pressure transducers 152 and 154 which are mechanically coupled to measure the respective pressures inside the first and second bladders 52*a* and 52*b*. The controller 2 receives signals representing the internal pressure of the first bladder 52*a* from pressure transducer 152 via electrical connection 162, while it also receives signals representing the internal pressure of the second bladder 52*b* from pressure transducer 154 via electrical connection 164. The controller 2 is programmed to monitor the pressure in each bladder to detect leaks and avoid over-inflating the bladders.

In accordance with an alternative stabilization procedure, the bladders can be inflated concurrently by operating the air pump with all of the electrically controllable valves opened.

Figure 9:
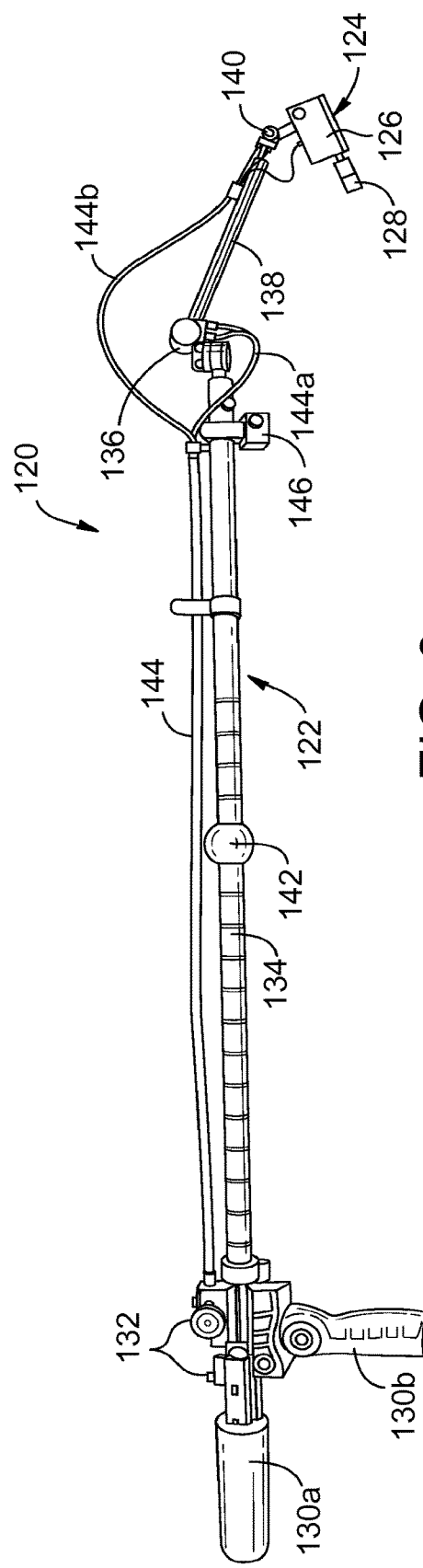
FIG. 9 is a diagram representing a side view of a manipulator arm for NDI including a scanner with a probe (disclosed in U.S. patent application Ser. No. 13/547,190 filed on Jul. 12, 2012, which is assigned to the assignee of the instant application).

FIG. 9 shows an alternative extended-reach tool assembly 120 which may be modified to incorporate stabilizers of the types disclosed above. The extended-reach tool assembly 120 comprises a manipulator arm 122 with an end effector 138 pivotably coupled to the distal end thereof. A maintenance tool 124 is in turn pivotably coupled to the distal end of the end effector 138. In the embodiment shown, the maintenance tool 124 comprises a scanner 126 and a probe 128. The probe 128 may include, for example, an eddy current sensor, a magnetic sensor, an ultrasonic sensor, or the like.

For the embodiment shown, the manipulator arm 122 comprises a main shaft 134 having operator handles 130*a* and 130*b* and control knobs and switches 132 coupled to a proximal end of main shaft 134. A slider ball 142 provided on the main shaft 134 can be coupled to the previously disclosed positional and rotational control assembly 50, which in turn is attached to a base mount 48 (as seen in FIG. 1), to allow a technician to slide the manipulator arm 122 deeper into a limited-access space. The slider ball 142 provides a location for the technician to steady the manipulator arm 122. A video camera 146 may be mounted near the distal end of the main shaft 134 for situational awareness to aid the operator in placement of the distal end of the maintenance tool 124.

Still referring to FIG. 9, the end effector 138 comprises a shaft pivotably coupled to the distal end of main shaft 134 by a multi-axis elbow joint 136. To provide an additional degree of articulation, the maintenance tool 124 is pivotably coupled to the distal end of end effector 138 by a wrist joint 140. Control cables 144 may extend from the control knobs and switches 132 to respective motors of the multi-axis elbow joint 136 (cable 144*a*) and wrist joint (cable 144*b*).

In cases where the main shaft 134 is so long that its distal end is difficult to hold steady, the extended-reach tool assembly 120 may be modified to include either stabilizing finger assemblies (as disclosed above with reference to FIGS. 1 and 2) or bladders (as disclosed above with reference to FIGS. 6 and 7) near the distal end of the main shaft 134.

Although the embodiments described above each have three extendible stabilizers, in some situations it may be sufficient if the stabilizing apparatus includes only two stabilizers. For example, in one possible configuration, the stabilizing apparatus may comprise only two extendible stabilizing finger assemblies of the type depicted in FIG. 1, both stabilizing finger assemblies being situated to support the weight of the extended-reach tool assembly (i.e., each finger assembly acts as a leg), but providing no resistance to upward displacement of the distal end of arm segment 18. This option may be sufficient in applications where operation of the maintenance tool 22 does not produce forces sufficient to lift the distal end of arm segment 18.

As previously mentioned, the extended-reach tool assembly can be coupled to an access end of a structure defining a limited-access space by means of an optional positional and rotational control assembly 50 (see FIGS. 1 and 6). In accordance with some embodiments, the positional and rotational control assembly takes the form of a gimbal assembly with encoders for attaching a proximal end of an extended-reach tool assembly to a bulkhead access port or other aperture in a structure being serviced. More specifically a the positional and rotational control assembly may comprise: a fixture attached to a bulkhead access port or other opening in the structure; a joint configuration with three rotational degrees of freedom; rotational encoders which allow tracking of rotation displacement of a ball or ring joint; a translating mounting fixture allowing translation of the joint from side to side and up and down for a wide range of coverage; a linear position encoder which allows tracking of linear insertion of the extended-reach tool assembly; and linear position encoders allowing tracking of lateral displacement of a ball or ring joint. Kinematic equations of motion can be used to compute the location of a distal end of the arm, to which the end effector is coupled. Software that models the structure can utilize this information to locate the end effector within the unseen areas being inspected.

In the embodiment depicted in FIGS. 10A and 10B, the positional and rotational control assembly comprises a gimbal assembly that includes parallel slides 56, 58, blocks 64, 66, rail 68, and sliding attachment ring 70 positioned adjacent an opening 40 in a wall 42 of the structure being serviced. Slides 56, 58 may include longitudinal slots 60, 62, respectively, that receive blocks 64, 66 for relative slidable movement in the directions indicated by double-headed arrow A. The rail 68 is pivotably coupled to blocks 64, 66 for relative rotational movement in the directions indicated by double-headed arrow B. The rail 68 extends between the slides 56, 58 across opening 40. The sliding attachment ring 70 is coupled to rail 68 for slidable or translational movement in the directions indicated by double-headed arrow C and pivotal movement in the directions indicated by double-headed arrow D (i.e., about an axis normal to rail 68) relative to rail 68. Further, a shaft 46 of an extended-reach tool assembly 120 (both of which are only partially depicted in FIGS. 10A and 10B) is coupled to the sliding attachment ring 70 for slidable movement in the directions indicated by double-headed arrow E and rotational movement in the directions indicated by double-headed arrow F relative to sliding attachment ring 70. The shaft 46 extends through the opening 40 and into a limited-access space 44.

As shown in FIG. 10B, slide 56 may include a linear encoder located at 72 for transmitting a signal indicative of the position of block 64 relative to slide 56 along a direction indicated by arrow A (see FIG. 10A), and block 64 may include a rotational encoder located at 74 for transmitting a signal indicative of the relative rotation angle of rail 68 relative to block 64 in the direction indicated by arrow B (see FIG. 10A). Rail 68 may include a linear encoder located at 76 for transmitting a signal indicative of the position of sliding attachment ring 70 relative to rail 68 in the direction indicated by arrow C (see FIG. 10A), and sliding attachment ring 70 may include rotational encoders located at 78, 80 for transmitting signals indicative of a pivotal orientation of the sliding attachment ring 70 in the direction indicated by arrow D (see FIG. 10A) and the rotational position of shaft 46 in the direction indicated by arrow F (see FIG. 10A), respectively. The signals from the encoders may all be transmitted to a controller for processing, including indication of the location of the distal end of shaft 46 relative to the opening 40.

The apparatus shown in FIGS. 10A and 10B facilitates maintenance in a limited-access space by providing a stable platform and wide-angle pivot point for an extended-reach tool assembly. It may also provide important positional and rotational reference for the maintenance tool relative to the structure.

While apparatus and methods for stabilizing an extended-reach tool assembly in a limited-access space have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

As used herein, the term "location" includes position and orientation. As used herein, the term "plurality" means two or more, i.e., at least two.

The invention claimed is:

1. An extended-reach assembly comprising:
    an articulated arm comprising a first arm segment, a second arm segment pivotably coupled to said first arm segment by means of a first multi-axis pivotable coupling having at least two degrees of rotational freedom, and a third arm segment pivotably coupled to said second arm segment by means of a second multi-axis pivotable coupling having at least two degrees of rotational freedom;
    an end effector pivotably coupled to a distal end of said third arm segment by means of a third multi-axis pivotable coupling having at least two degrees of rotational freedom; and
    a plurality of extendible stabilizing finger assemblies mounted to said third arm segment, wherein each of said stabilizing finger assemblies can be actuated to transform from a first configuration, in which a portion of said stabilizing finger assembly is a first radial distance from said third arm segment, into a second configuration, in which said portion of said stabilizing finger assembly is a second radial distance from said third arm segment, said second radial distance being greater than said first radial distance.

2. The extended-reach assembly as recited in claim 1, further comprising a pressure switch arranged to measure an external pressure exerted on one of said stabilizing finger assemblies during actuation and configured to issue an output signal in response to the measured external pressure equaling or exceeding a preset threshold.

3. The extended-reach assembly as recited in claim 1, wherein each of said stabilizing finger assemblies comprises a link assembly and a contact pad supported by said link assembly, wherein said link assembly comprises first and second links which are pivotably coupled to each other.

4. The extended-reach assembly as recited in claim 3, wherein said contact pad is pivotably coupled to said link assembly.

5. The extended-reach assembly as recited in claim 3, further comprising:
    a support block affixed to said third arm segment, said first link having one end which is pivotably coupled to said support block;
    a carriage which is translatable along said third arm segment and comprises a nut, said second link having one end which is pivotably coupled to said carriage; and
    a lead screw rotatably coupled to said support block and threadably coupled to said nut,
    wherein said contact pad is movable from a first position at said first distance to a second position at said second distance in response to rotation of said lead screw in one direction, and is movable from said second position to said first position in response to rotation of said lead screw in a direction opposite to said one direction.

6. The extended-reach assembly as recited in claim 1, further comprising a camera mounted to said arm to provide situational awareness of a space in which said end effector is located.

7. The extended-reach assembly as recited in claim 1, further comprising a tool attached to said end effector.

8. The extended-reach assembly as recited in claim 7, wherein said tool comprises a non-destructive inspection unit.

9. The extended-reach assembly as recited in claim 7, wherein said tool comprises an automated tool for performing a maintenance function other than non-destructive inspection.

10. A system comprising:
    a hollow structure containing a limited-access space and having an opening;
    an extended-reach tool assembly that extends through said opening and into said limited-access space, wherein said extended-reach tool assembly comprises:
        an articulated arm comprising a first arm segment, a second arm segment pivotably coupled to said first arm segment by means of a first multi-axis pivotable coupling having at least two degrees of rotational freedom, and a third arm segment pivotably coupled to said second arm segment by means of a second multi-axis pivotable coupling having at least two degrees of rotational freedom, said third arm segment comprising a distal portion disposed in said limited-access space;
        an end effector coupled to said distal portion of said arm and disposed in said limited-access space; and
        a plurality of stabilizing finger assemblies mounted to said distal portion of said third arm segment, disposed in said limited-access space and actuatable for stabilizing said distal portion of said third arm segment by contact with said hollow structure in a plurality of contact areas.

11. The system as recited in claim 10, wherein each stabilizing finger assembly comprises a respective link assembly and a respective contact pad supported by said respective link assembly, wherein said respective link assembly comprises respective first and second links which are pivotably coupled to each other.

12. The system as recited in claim 11, wherein said respective contact pad is pivotably coupled to said respective link assembly.

13. The system as recited in claim 10, wherein said extended-reach tool assembly further comprises a camera mounted to said distal portion of said third arm segment to provide situational awareness of a portion of said limited-access space in which said detachable tool is located.

14. The system as recited in claim 10, wherein said detachable tool comprises a non-destructive inspection unit.

15. The system as recited in claim 10, wherein said detachable tool comprises a tool for performing a maintenance function other than non-destructive inspection.

16. A method for performing a maintenance function in a limited-access space of a hollow structure using an extended-reach tool assembly comprising an articulated arm comprising a first arm segment, a second arm segment pivotably coupled to said first arm segment by means of a first multi-axis pivotable coupling having at least two degrees of rotational freedom, and a third arm segment pivotably coupled to said second arm segment by means of a second multi-axis pivotable coupling having at least two degrees of rotational freedom, said third arm segment comprising a distal portion, an end effector coupled to the distal portion of said third arm segment, and a plurality of stabilizing finger assemblies mounted to the distal portion of said third arm segment, comprising:
  (a) inserting the distal portion of said third arm segment through an opening in the hollow structure until the end effector and the plurality of stabilizing finger assemblies of the extended-reach tool assembly are located in the limited-access space;
  (b) actuating the plurality of stabilizing finger assemblies of the extended-reach tool assembly to cause the stabilizing finger assemblies to move into contact with an internal surface of the hollow structure in respective contact areas; and
  (c) actuating the end effector to move to a target location while the portion of the extended-reach tool assembly is stable.

17. The method as recited in claim 16, further comprising actuating a tool mounted to the end effector while the portion of the extended-reach tool assembly is stable and the end effector is at the target location.

18. The method as recited in claim 16, wherein operations (b) and (c) are initiated remotely by an operator interacting with a user interface located outside the hollow structure.

19. The method as recited in claim 16, wherein the stabilizing finger assemblies extend in response to operation (b).

\* \* \* \* \*